United States Patent
Truscott (10) Patent No.: US 10,974,432 B2
(45) Date of Patent: Apr. 13, 2021

(54) EXTRUSION SYSTEM INCLUDING AN EDGE ENCAPSULATION BLOCK

(71) Applicant: NORDSON CORPORATION, Westlake, OH (US)

(72) Inventor: Michael Truscott, Chippewa Falls, WI (US)

(73) Assignee: Nordson Corporation, Westlake, OH (US)

( * ) Notice: Subject to any disclaimer, the term of this patent is extended or adjusted under 35 U.S.C. 154(b) by 255 days.

(21) Appl. No.: 15/716,442

(22) Filed: Sep. 26, 2017

(65) Prior Publication Data
US 2019/0091912 A1    Mar. 28, 2019

(51) Int. Cl.
| | |
|---|---|
| *B29C 48/19* | (2019.01) |
| *B29C 48/305* | (2019.01) |
| *B29C 48/255* | (2019.01) |
| *B29C 48/30* | (2019.01) |
| *B29C 48/07* | (2019.01) |

(Continued)

(52) U.S. Cl.
CPC .............. *B29C 48/30* (2019.02); *B29C 48/07* (2019.02); *B29C 48/08* (2019.02); *B29C 48/19* (2019.02); *B29C 48/255* (2019.02); *B29C 48/2556* (2019.02); *B29C 48/268* (2019.02); *B29C 48/304* (2019.02); *B29C 48/307* (2019.02)

(58) Field of Classification Search
CPC ......... B29C 48/07; B29C 48/08; B29C 48/19; B29C 48/255; B29C 48/2556; B29C 48/268; B29C 48/30; B29C 48/304; B29C 48/307
See application file for complete search history.

(56) References Cited

U.S. PATENT DOCUMENTS

| | | | | |
|---|---|---|---|---|
| 3,072,962 A | * | 1/1963 | McDermott | ............ B29C 48/08 264/177.19 |
| 4,248,579 A | * | 2/1981 | Maejima | ................ B29C 48/30 425/227 |

(Continued)

FOREIGN PATENT DOCUMENTS

| | | |
|---|---|---|
| EP | 0642912 A1 | 3/1995 |
| JP | 2009-297945 A | 12/2009 |
| WO | 2009/016534 A2 | 2/2009 |

OTHER PUBLICATIONS

European Patent Application No. 18196487.5; Extended Search Report; dated Feb. 13, 2019.

*Primary Examiner* — Xiao S Zhao
*Assistant Examiner* — Joseph S Leyson
(74) *Attorney, Agent, or Firm* — BakerHostetler (57) ABSTRACT

An extrusion system including an edge encapsulation block is disclosed. The edge encapsulation block includes a housing that defines a central extrusion channel having an inlet for receiving a central material and an outlet for emitting an encapsulated material that includes the central material and an edge material, and an edge encapsulation channel for receiving the edge material. The encapsulation block also includes an edge blocker that includes an edge actuator at a first end of the edge blocker and an edge block at a second end of the edge blocker that is opposite the first end. Actuation of the edge actuator causes the edge block to translate from a first position to a second position spaced from the first position along an axis that extends through the central extrusion channel.

20 Claims, 9 Drawing Sheets

(51) Int. Cl.
*B29C 48/08* (2019.01)
*B29C 48/25* (2019.01)

(56) References Cited

U.S. PATENT DOCUMENTS

| | | | |
|---|---|---|---|
| 4,533,510 A | | 8/1985 | Nissel |
| 4,695,236 A | * | 9/1987 | Predohl .................. B29C 48/30 |
| | | | 425/131.1 |
| 4,784,815 A | * | 11/1988 | Cloeren .................. B29C 48/30 |
| | | | 264/173.12 |
| 5,375,990 A | * | 12/1994 | Krupa ..................... B29C 48/49 |
| | | | 425/133.5 |
| 5,451,357 A | * | 9/1995 | Cloeren .................. B29C 48/30 |
| | | | 264/173.16 |
| 5,616,350 A | * | 4/1997 | Wissmann ............ B29C 48/695 |
| | | | 425/133.1 |
| 8,460,588 B2 | | 6/2013 | Lake et al. |

\* cited by examiner

EXTRUSION SYSTEM INCLUDING AN EDGE ENCAPSULATION BLOCK

TECHNICAL FIELD

The present invention relates to blocks for applying an edge material to a central extruded material in an extrusion system to create an encapsulated material. More particularly, this invention relates to a block that allows for adjusting the thickness of an edge material applied to the central extruded material.

BACKGROUND

Sheets or webs of a material are often formed using an extrusion process. For example, a thermoplastic may be heated and extruded through a die to form a sheet of desired thickness. At times, it may be desired to coextrude two or more different materials to form a laminate. This has been accomplished in the past through the use of multi-manifold dies or by combining the flows of the materials upstream of a single manifold die. In the latter case, a feed block is coupled between two or more extruders and the die and combines the flows of the various materials.

However, the flow of material emitted from die or feed block can include unstable edges that have wavy or nonlinear orientations. Further, the flow of material may not completely solidify upon exiting the die or feed block, which can lead to migration of the material's edge. As a result, an operator of an extrusion process is required to trim and further shape the edges of the material to produce a product with the intended shape and dimensions. This trimming can lead to high levels of waste, particularly when the extruded material is expensive and the amount of material that needs to be trimmed is significant.

Therefore, there is a need for a device that add material to the edges of a flow of extruded material to prevent the waste of expensive material due to trimming of the material's edges.

SUMMARY

An embodiment of the present invention is an edge encapsulation block that includes a housing that defines a central extrusion channel having an inlet for receiving a central material and an outlet for emitting an encapsulated material that includes the central material and an edge material. The housing also includes an edge encapsulation channel for receiving the edge material. The edge encapsulation block includes an edge blocker that includes an edge actuator at a first end of the edge blocker and an edge block at a second end of the edge blocker that is opposite the first end. Actuation of the edge actuator causes the edge block to translate from a first position to a second position spaced from the first position along an axis that extends through the central extrusion channel.

Another embodiment of the present invention is an extrusion system that includes an edge encapsulation block. The edge encapsulation block includes a housing that defines a central extrusion channel having an inlet for receiving a central material and an outlet for emitting an encapsulated material that includes the central material and an edge material, and an edge encapsulation channel for receiving the edge material. The edge encapsulation block also includes an edge blocker including an edge actuator and an edge block connected to the edge actuator. Actuation of the edge actuator causes the edge block to translate from a first position to a second position spaced from the first position along an axis that extends through the central extrusion channel. The extrusion system also includes a die having an inlet for receiving the edge encapsulated material and an outlet for emitting an extruded material.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

DETAILED DESCRIPTION OF ILLUSTRATIVE EMBODIMENTS

An extrusion system 10 includes an edge encapsulation block 15 that receives a central material and outputs an encapsulated material that can comprise the central material bounded on each lateral side by an edge material. The thickness of the edge material is determined by first and second edge blockers 200 and 300 that are releasably coupled to the edge encapsulation block 15. Certain terminology is used to describe the edge encapsulation block 15 in the following description for convenience only and is not limiting. The words "right," "left," "lower," and "upper" designate directions in the drawings to which reference is made. The words "inner" and "outer" refer to directions toward and away from, respectively, the geometric center of the description to describe the edge encapsulation block 15 and related parts thereof. The words "forward" and "rearward" refer to directions in a longitudinal direction 2 and a direction opposite the longitudinal direction 2 along the edge encapsulation block 15 and related parts thereof. The terminology includes the above-listed words, derivatives thereof, and words of similar import.

Unless otherwise specified herein, the terms "longitudinal," "lateral," and "vertical" are used to describe the orthogonal directional components of various components of the edge encapsulation block 15, as designated by the longitudinal direction 2, lateral direction 4, and vertical direction 6. It should be appreciated that while the longitudinal and lateral directions 2 and 4 are illustrated as extending along a horizontal plane, and the vertical direction 6 is illustrated as extending along a vertical plane, the planes that encompass the various directions may differ during use.

Additionally, the longitudinal direction 2 may also be referred to as the machine direction.

Figure 1:
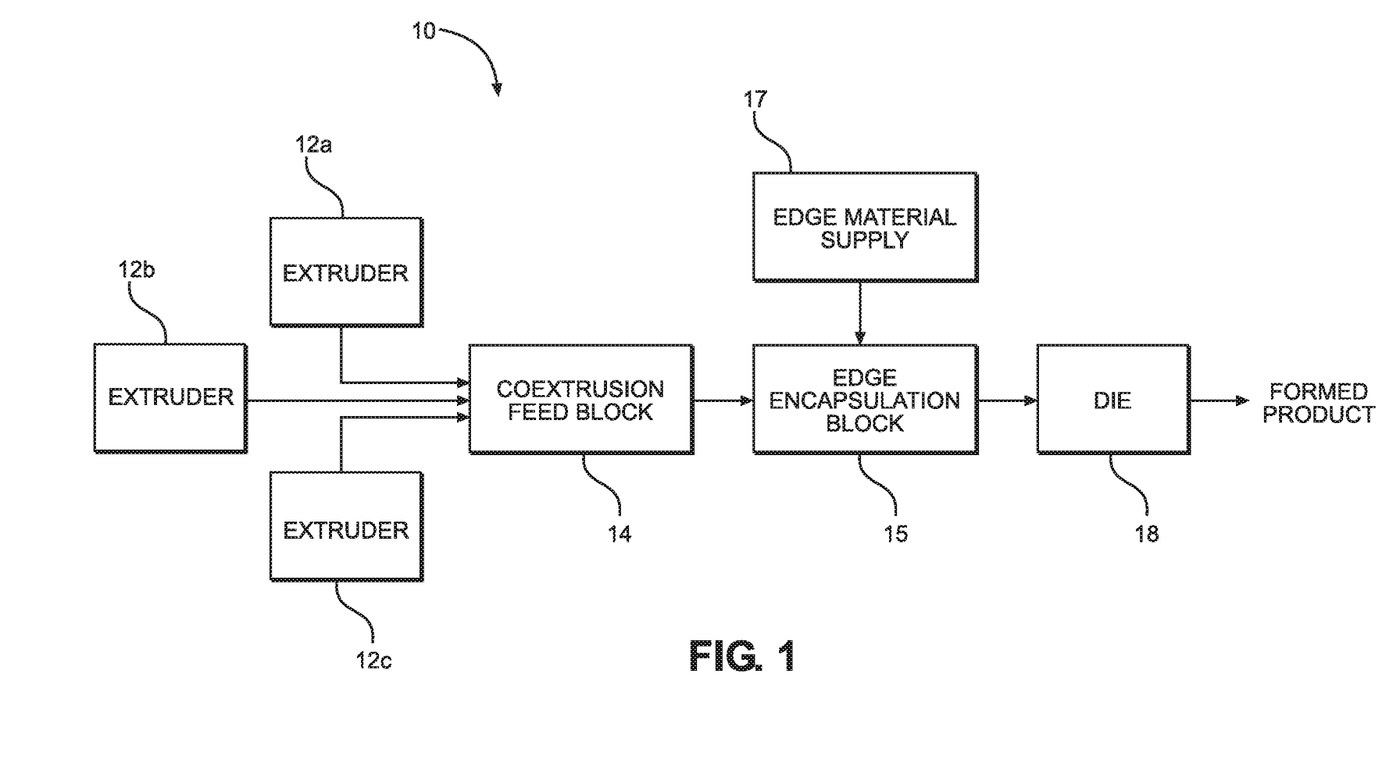
FIG. 1 is a schematic view of an extrusion system according to an embodiment of the present invention.

Embodiments of the present invention include an edge encapsulation block 15 for applying an edge material to the lateral edges of an extruded central material. Referring to FIG. 1, the edge encapsulation block 15 can be part of an extrusion system 10. The extrusion system 10 can include a plurality of extruders 12a, 12b, and 12c, which each extrudes a flowable material, such as a thermoplastic material, into a coextrusion feed block 14. The materials extruded from the extruders 12a-12c may all be different. Alternatively, some or all of the material extruded from the extruders 12a-12c may be identical. While three extruders 12a-12c are shown as connected to the coextrusion feed block 14, the coextrusion feed block 14 can be alternatively configured to receive material from any number of extruders. The coextrusion feed block 14 can combine the individual extrusion flows received from the extruders 12a-12c into a multilayer material that is provided to the edge encapsulation block 15, which then adds an edge material to the lateral edges of the multilayer material to form an encapsulated material, as will be described further below. The edge material can be a reground material comprising waste resin or any other type of inexpensive resin. The edge material can be provided to the edge encapsulation block 15 from an edge material supply 17, which can be an extruder, adhesive melter, or other device capable of supplying a flowable edge material to the edge encapsulation block 15. The edge encapsulation block 15 then provides the encapsulated material to a die 18, which forms the encapsulated material into a desired product, such as a sheet, web, or coating. Though the extrusion system 10 is depicted as including a coextrusion feed block 14, the extrusion system 10 can alternatively include a monolayer feed block (not shown) that feeds a monolayer material to the coextrusion feed block 14.

Figure 2:
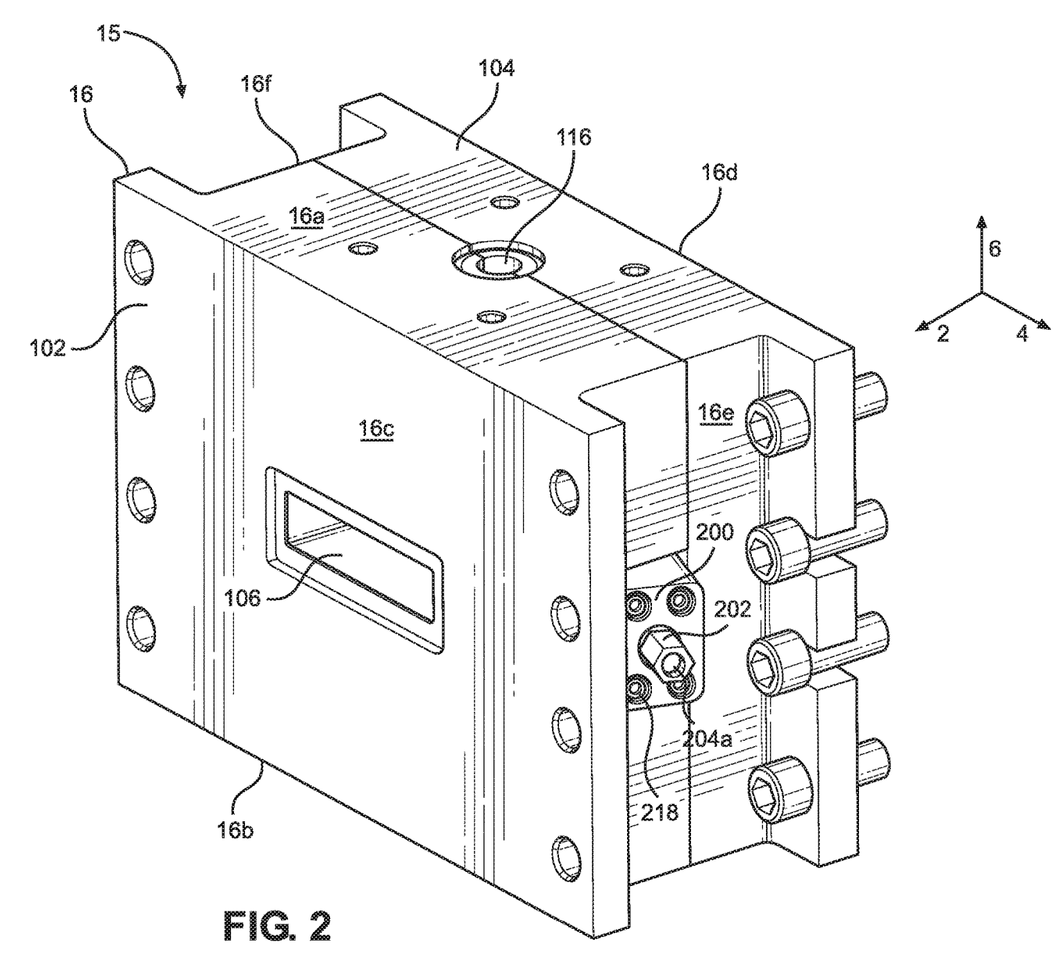
FIG. 2 is a front perspective view of an edge encapsulation block according to an embodiment of the present invention.
Figure 3:
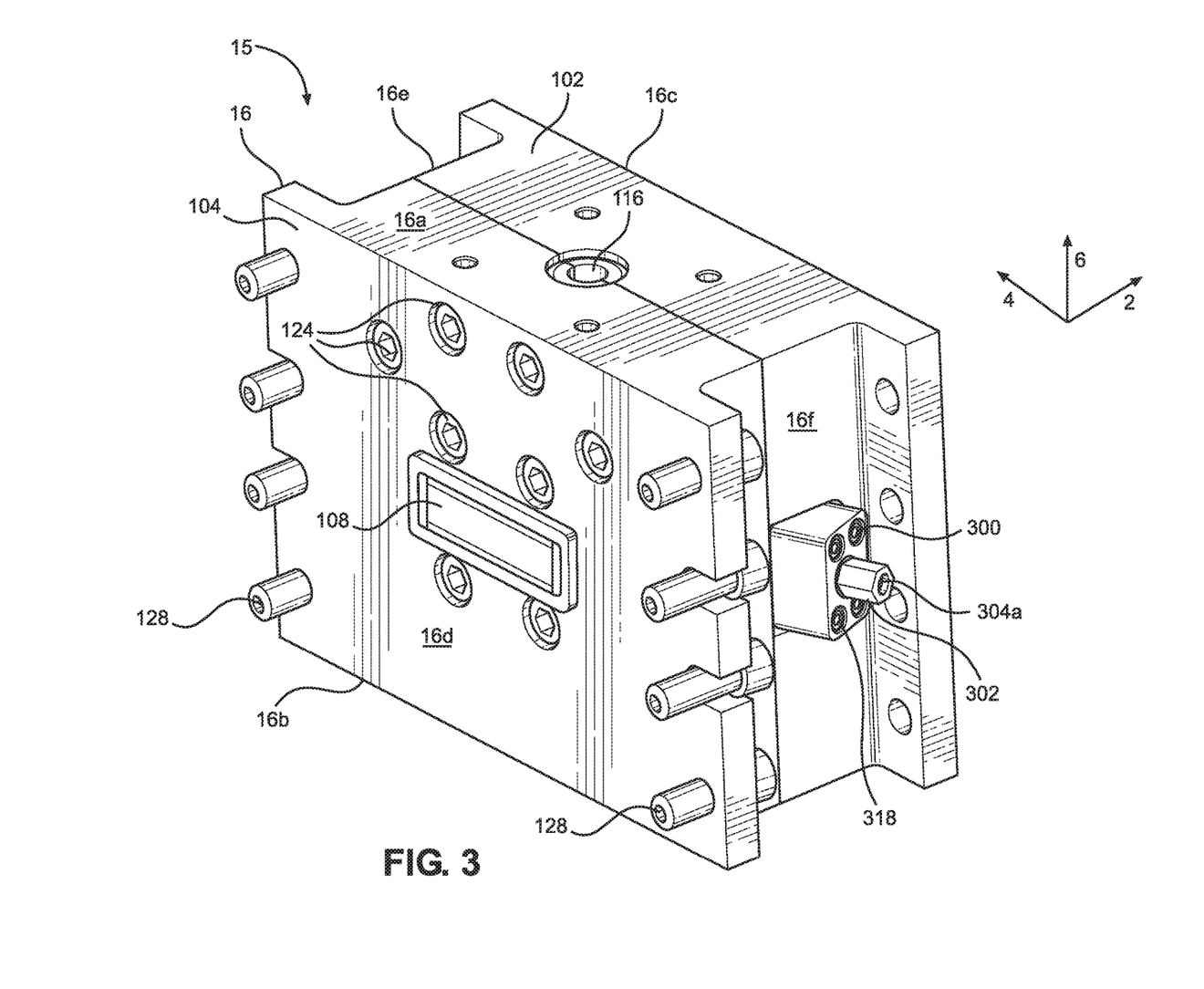
FIG. 3 is a rear perspective view of the edge encapsulation block shown in FIG. 2.

FIGS. 2-8 illustrate the edge encapsulation block 15 in detail. With reference to FIGS. 2-3, the edge encapsulation block 15 can includes a housing 16 that has a top surface 16a, a bottom surface 16b opposite the top surface 16a along the vertical direction 6, a front surface 16c, a rear surface 16d opposite the front surface 16c along the longitudinal direction 2, a first side surface 16e, and a second side surface 16f opposite the first side surface 16e along the lateral direction 4. The housing 16 can comprise a first block 102 and a second block 104 releasably coupled to the first block 102, such that the first and second blocks 102 and 104 collectively define the housing 16. The edge encapsulation block 15 can include a plurality of fasteners 124 that are configured to extend at least partially through the first and second blocks 102 and 104 to releasably couple the first block 102 to the second block 104. The fasteners 124 can be threaded screws, bolts, or any other devices for releasably coupling the first and second blocks 102 and 104. Though eight fasteners 124 are depicted, the edge encapsulation block 15 can comprise any number of fasteners 124 as desired. When the fasteners 124 secure the first block 102 to the second block 104, the fasteners 124 can extend through a plurality of boreholes 134 defined by the first block 102 and a plurality of boreholes 138 defined by the second block 104. Generally, the boreholes 134 and 138 will align when the first and second blocks 102 and 104 are connected. The boreholes 134 and/or 138 can optionally be threaded, but can also be unthreaded. Also, it is contemplated that the edge encapsulation block 15 can be defined such that the fasteners 124 are not necessary. For example, the first and second blocks 102 and 104 can include a tongue-and-groove structure or another complementary structure for physically coupling the first and second blocks 102 and 104. Although two blocks 102 and 104 are depicted, in other embodiments the housing 16 of the edge encapsulation block 15 can include more than two separate blocks. Alternatively, the housing 16 can define a one-piece, monolithic body. The edge encapsulation block 15 can also include a plurality of fasteners 128 that can couple the edge encapsulation block 15 to another part of the extrusion system 10. In one embodiment, the fasteners 128 can couple the edge encapsulation block 15 directly to the die 18.

The edge encapsulation block 15 defines a central extrusion channel 112 that extends through the housing 16, and thus through the first and second blocks 102 and 104 along the longitudinal direction 2. The central extrusion channel 112 can extend from an inlet 106 defined by the front surface 16c of the housing 16 to an outlet 108 defined by the rear surface 16d of the housing 16. The central extrusion channel 112 will be described in more detail below. As previously described, the inlet 106 can receive a multilayer or monolayer material, also referred to as a central material, from the coextrusion feed block 14 or any other feed block utilized in the extrusion system 10. After the central material passes through the central extrusion channel 112, and the encapsulated material is formed from the central material and the edge material, the encapsulated material can be emitted from the outlet 108 and directed to the die 18. Though the first and second blocks 102 and 104 are depicted as contacting along a plane that extends along the lateral and vertical directions 4 and 6, it is contemplated that the housing 16 can be configured such that the first and second blocks 102 and 104 contact along a plane that extends along the longitudinal and vertical directions 2 and 6. In this embodiment, the central extrusion channel 112 can extend along the entire length of the intersection between the first and second blocks 102 and 104.

Continuing with FIGS. 2-5, the edge encapsulation block 15 defines an edge encapsulation channel 120 that is selectively in fluid communication with the central extrusion channel 112, as will be described further below. The edge encapsulation channel 120 extends from an inlet 116 through the housing 16 to a first outlet 118a and a second outlet 118b located interior to the housing 16. As a result, the edge encapsulation channel 120 can define a first portion 120a that extends from the inlet 116 to the first outlet 118a and a second portion 120b that extends from the inlet 116 to the second outlet 118b. The first and second portions 120a and 120b of the edge encapsulation channel 120 can coincide at the portion of the edge encapsulation channel 120 near the inlet 116. Though the inlet 116 is depicted as being defined by the top surface 16a, the inlet 116 can alternatively be defined by any of the surfaces 16a-16f of the housing 16 as desired. Also, although two outlets 18a and 18b are shown, the edge encapsulation channel 120 can alternatively include one or more than two outlets, and likewise more than two portions, as desired.

Figure 4:
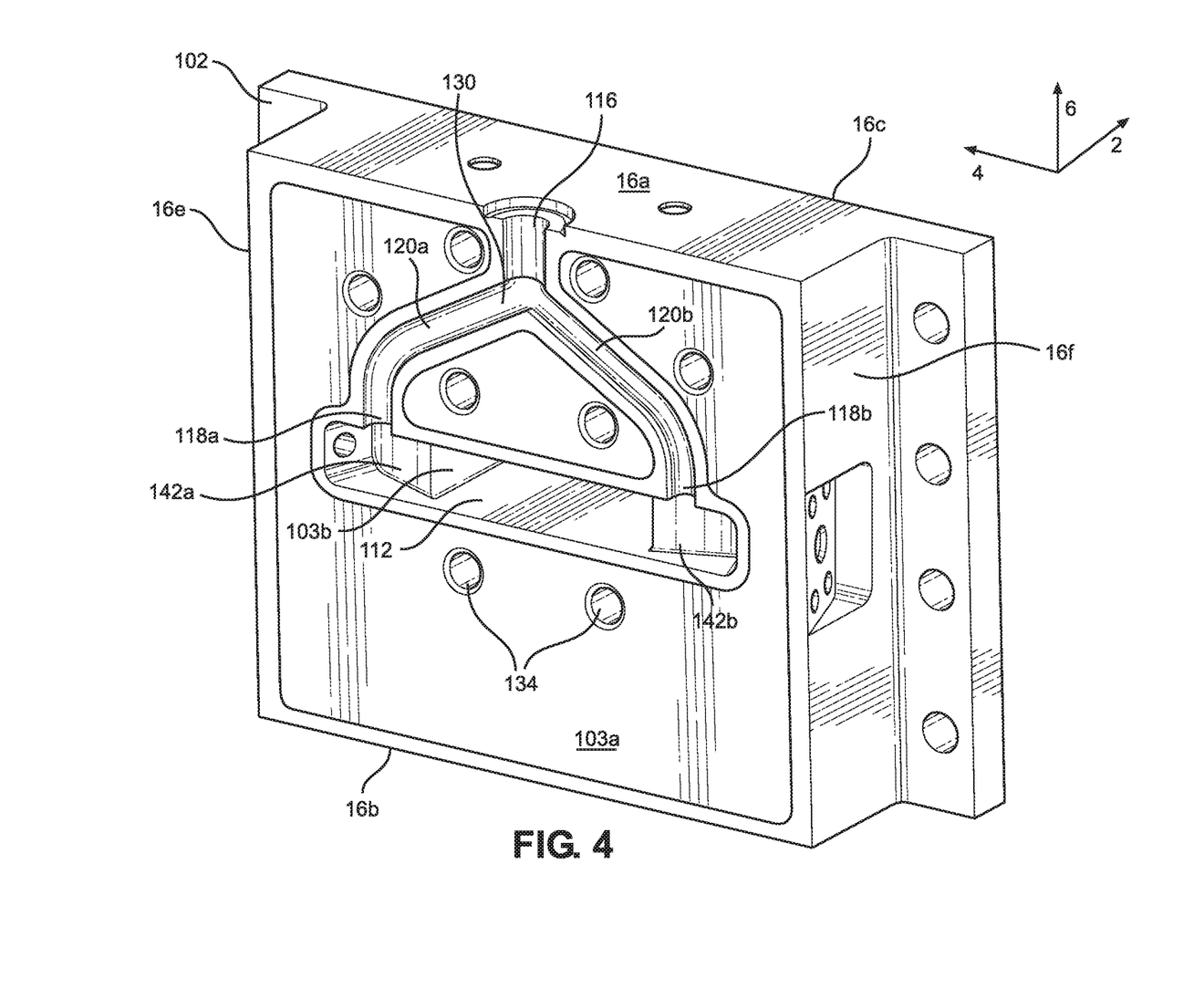
FIG. 4 is a perspective view of a first block of the edge encapsulation block shown in FIG. 2
Figure 5:
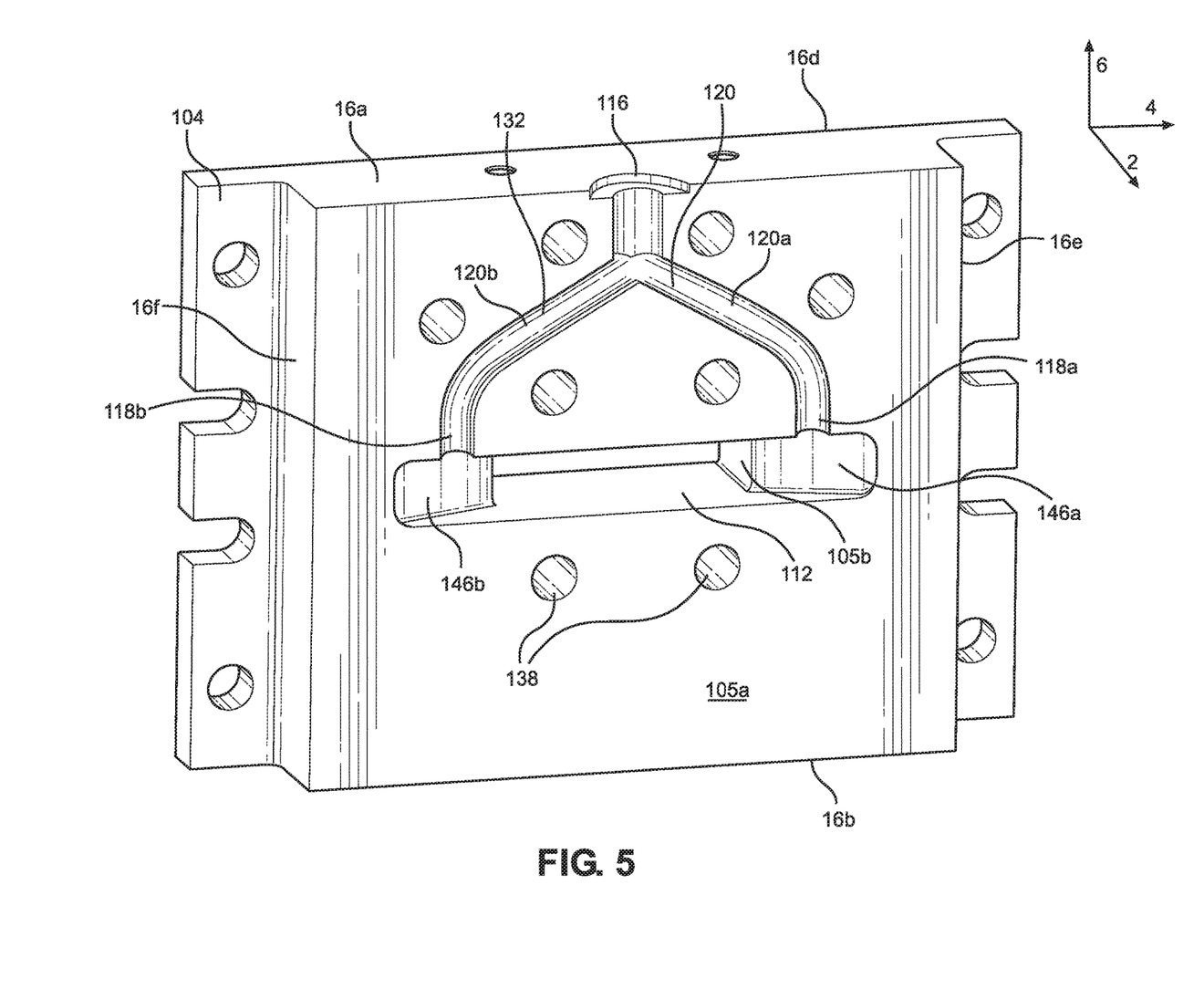
FIG. 5 is a perspective view of a second block of the edge encapsulation block shown in FIG. 2.

The edge encapsulation channel 120 can be partially defined by each of the first and second blocks 102 and 104. The first block 102 can define a first inner surface 103a that is opposite the front surface 16c of the housing 16 along the longitudinal direction 2, while the second block 104 can define a first inner surface 105a that is opposite the rear surface 16d along the longitudinal direction 2. The first block 102 can define a first recess 130 that extends into the first block 102 from the first inner surface 103a along the longitudinal direction 2, while the second block 104 can define a second recess 132 that extends into the second block from the first inner surface 105a along the longitudinal direction 2. When the first and second blocks 102 and 104 are connected to form the housing 16, the first inner surface 103a of the first block 102 engages the first inner surface 105a of the second block 104. Additionally, the first recess 130 of the first block 102 and the second recess 132 of the second block 104 substantially align when the first and second blocks 102 and 104 are connected, such that the recesses 130 and 132 collectively define the edge encapsulation channel 120. Additionally, each of the recesses 130 and 132 can partially define the inlet 116 and the outlets 118a and 118b of the edge encapsulation channel 120. Each of the recesses 130 and 132 can define a substantially semi-circular shaped, such that when the first and second blocks 102 and 104 are connected, the edge encapsulation channel 120 formed by the recesses 130 and 132 is substantially circular. However, it is also contemplated that the recesses 130 and 132 may comprise different shapes as desired. Though the edge encapsulation channel 120 is depicted as being defined by both of the first and second blocks 102 and 104, in another embodiment the edge encapsulation channel 120 can be only partially defined by both of the first and second blocks 102 and 104, or completely defined by only one of the first and second blocks 102 and 104.

The first and second blocks 102 and 104 can also define a plurality of pockets configured to receive a first edge blocker 200 and a second edge blocker 300, each of which will be discussed in detail below. The first block 102 can define a first pocket 142a and a second pocket 142b spaced from the first pocket along the lateral direction 4. The first pocket 142a is open to both the central extrusion channel 112 and the edge encapsulation channel 120, in particular the first outlet 118a of the edge encapsulation channel 120. Conversely, the second pocket 142b is open to both the central extrusion channel 112 and the edge encapsulation channel 120, in particular the second outlet 118b of the edge encapsulation channel 120. Likewise, the second block 104 can define a first pocket 146a and a second pocket 146b spaced from the first pocket 146a along the lateral direction 4. The first pocket 146a is open to both the central extrusion channel 112 and the first outlet 118a of the edge encapsulation channel 120, while the second pocket 146b is open to both the central extrusion channel 112 and the second outlet 118b of the edge encapsulation channel 120. When the first and second blocks 102 and 104 are coupled, the first pocket 142a of the first block 102 aligns with the first pocket 146a of the second block 104 and the second pocket 142b of the first block 102 aligns with the second pocket 146b of the second block 104. As a result, the first pockets 142a and 146a define a pocket configured to receive a portion of a first edge blocker 200, while the second pockets 142b and 146b define a pocket configured to receive a portion of a second edge blocker 300.

Figure 6A:
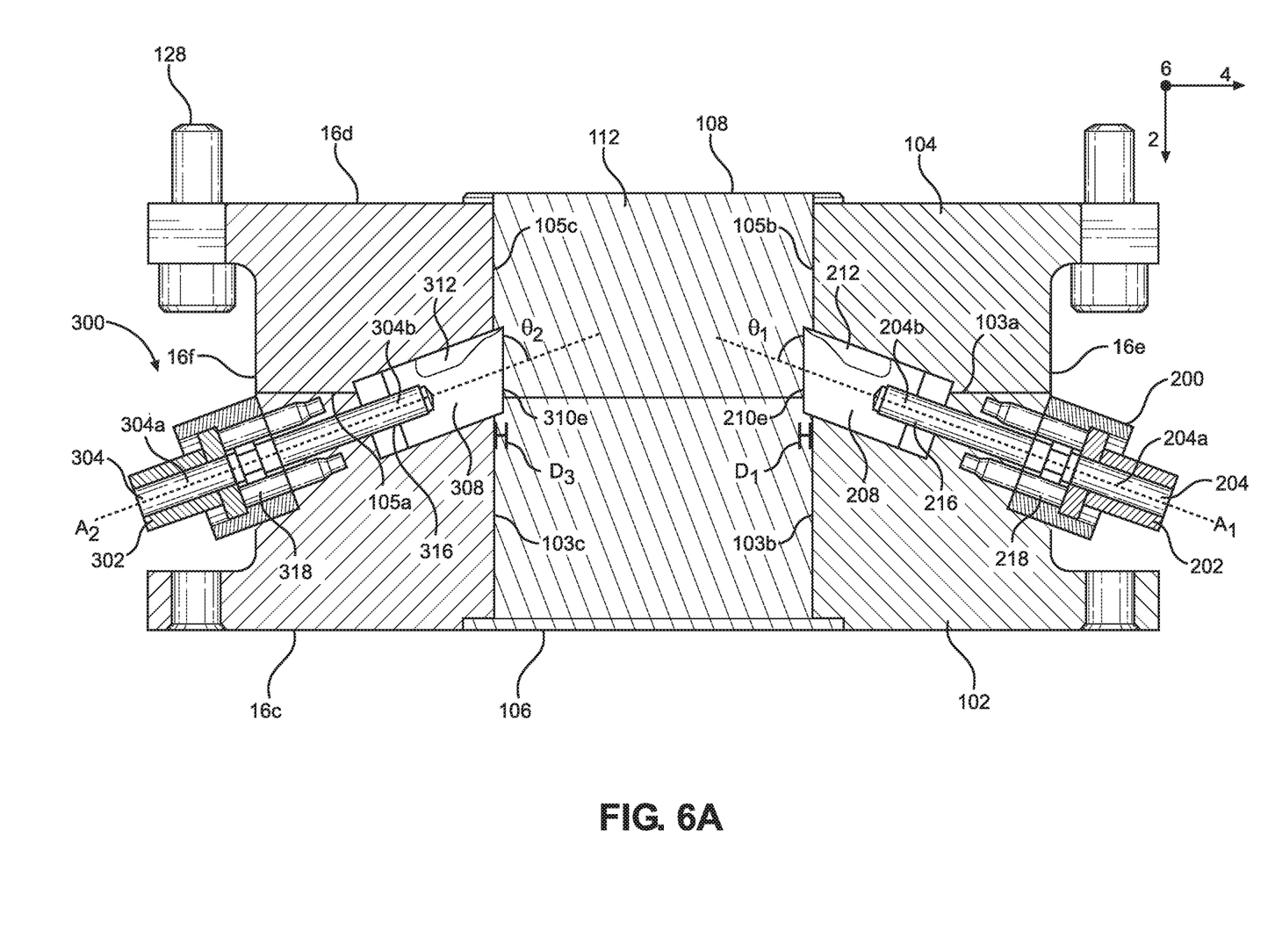
FIG. 6A is a top cross-sectional view of the edge encapsulation block shown in FIG. 2 in a first configuration.
Figure 6B:
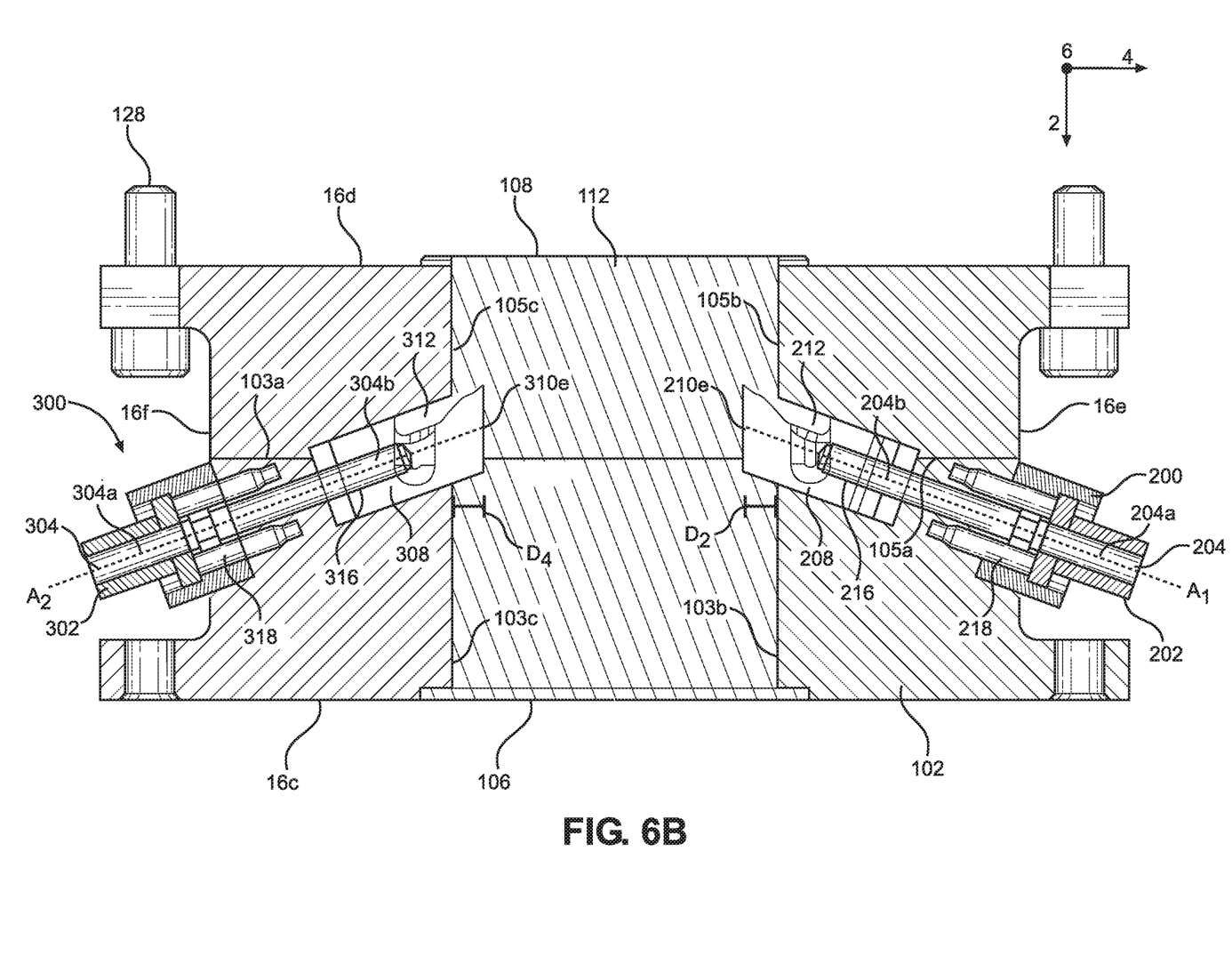
FIG. 6B is a top cross-sectional view of the edge encapsulation block shown in FIG. 2 in a second configuration.
Figure 7:
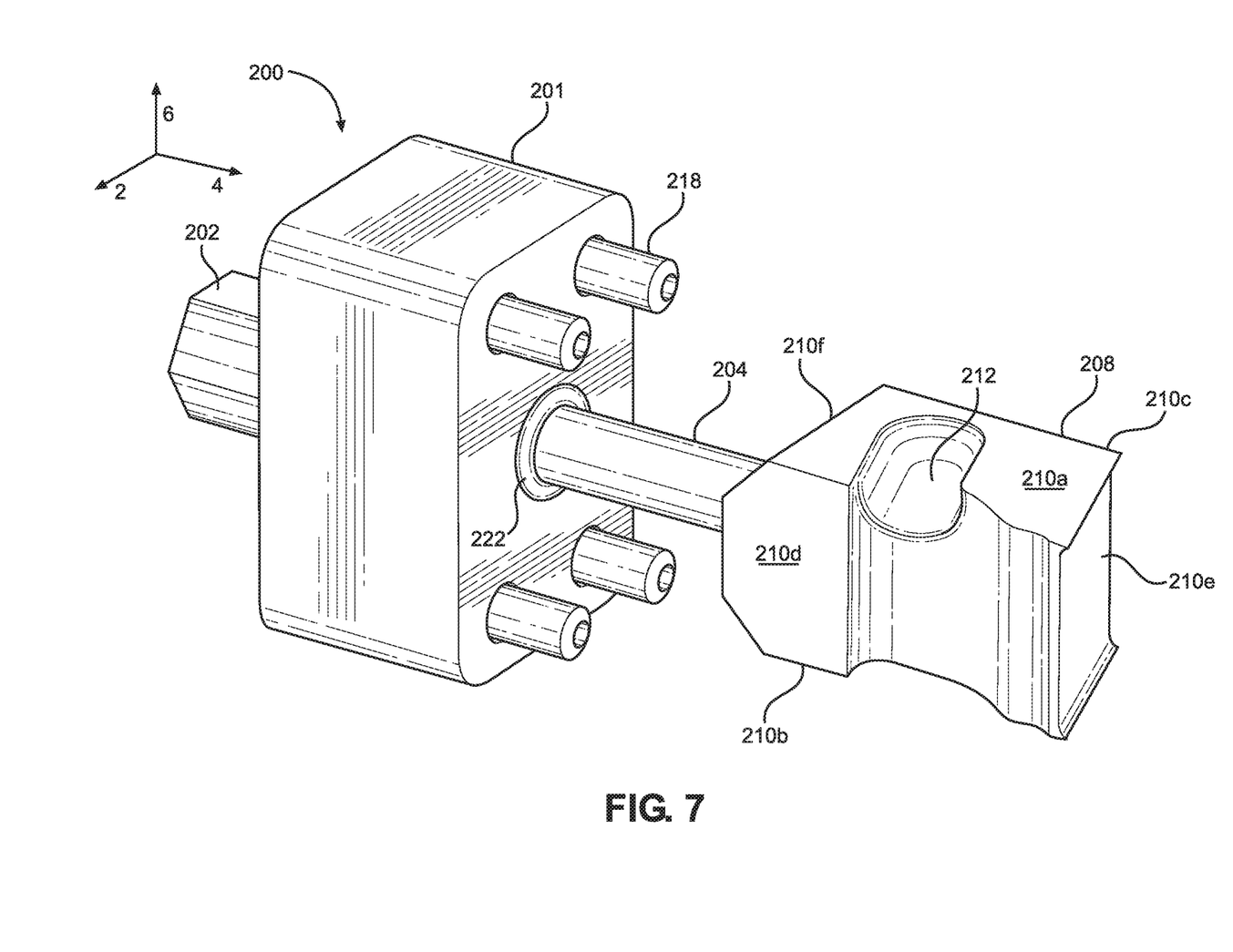
FIG. 7 is a perspective view of a first edge blocker of the edge encapsulation block shown in FIG. 2.

Continuing with FIGS. 6A-7, a first edge blocker 200 included in the edge encapsulation block 15 includes a mounting block 201 and an actuation shaft 204 that extends through the mounting block 201. One end of the actuation shaft 204 is coupled to an edge actuator 202 while the other end of the actuation shaft 204 is connected to an edge block 208, such that the edge actuator 202 defines a first end 204a of the first edge blocker 200, while the edge block 208 defines a second end 204b of the first edge blocker 200. The edge block 208 can define a top surface 210a, a bottom surface 210b opposite the top surface along the vertical direction 6, a front surface 210c, a rear surface 210d opposite the front surface 210c along the longitudinal direction 2, an inner surface 210e, which can also be referred to as the channel surface, and an outer surface 210f opposite the inner surface 210e along the lateral direction 4. The actuation shaft 204 can extend into the edge block 208 through a block bore 216 that extends into the edge block 208 from the outer surface 210f and terminates at a location within the edge block 208 that is spaced from the inner surface 210e. The block bore 216 can define an internal threading that is configured to mate with an external threading defined by the actuator shaft 204, such that the edge block 208 and the actuator shaft 204 are threadedly connected. The edge block 208 can define a recess 212 that extends into the body of the edge block 208 for directing a flow of edge material, as will be described below. In the depicted embodiment, the recess 212 extends into the body of the edge block 208 from the top surface 310a and the rear surface 210d. However, in other embodiments of the first edge blocker 200, the recess 212 can extend into the edge block 208 from different ones of the surfaces 210a-210f as desired. To attach the first edge blocker 200 to the edge encapsulation block 15, fasteners 218 extend through the mounting block 201 and through the first side surface 16e of the housing 16. The fasteners 218 can be threaded, such that the fasteners 218 releasably couple the first edge blocker 200 to the housing 16. Alternatively, the fasteners 218 can permanently affix the first edge blocker 200 to the edge encapsulation block 15. The first edge blocker 200 can also include a seal 222, such as an O-ring, disposed around the actuator shaft 204 at the location the actuator shaft 204 extends through the inner side of the mounting block 201. This seal 222 can prevent edge material from migrating through the mounting block 201 and exiting the edge encapsulation block 15.

Figure 8:
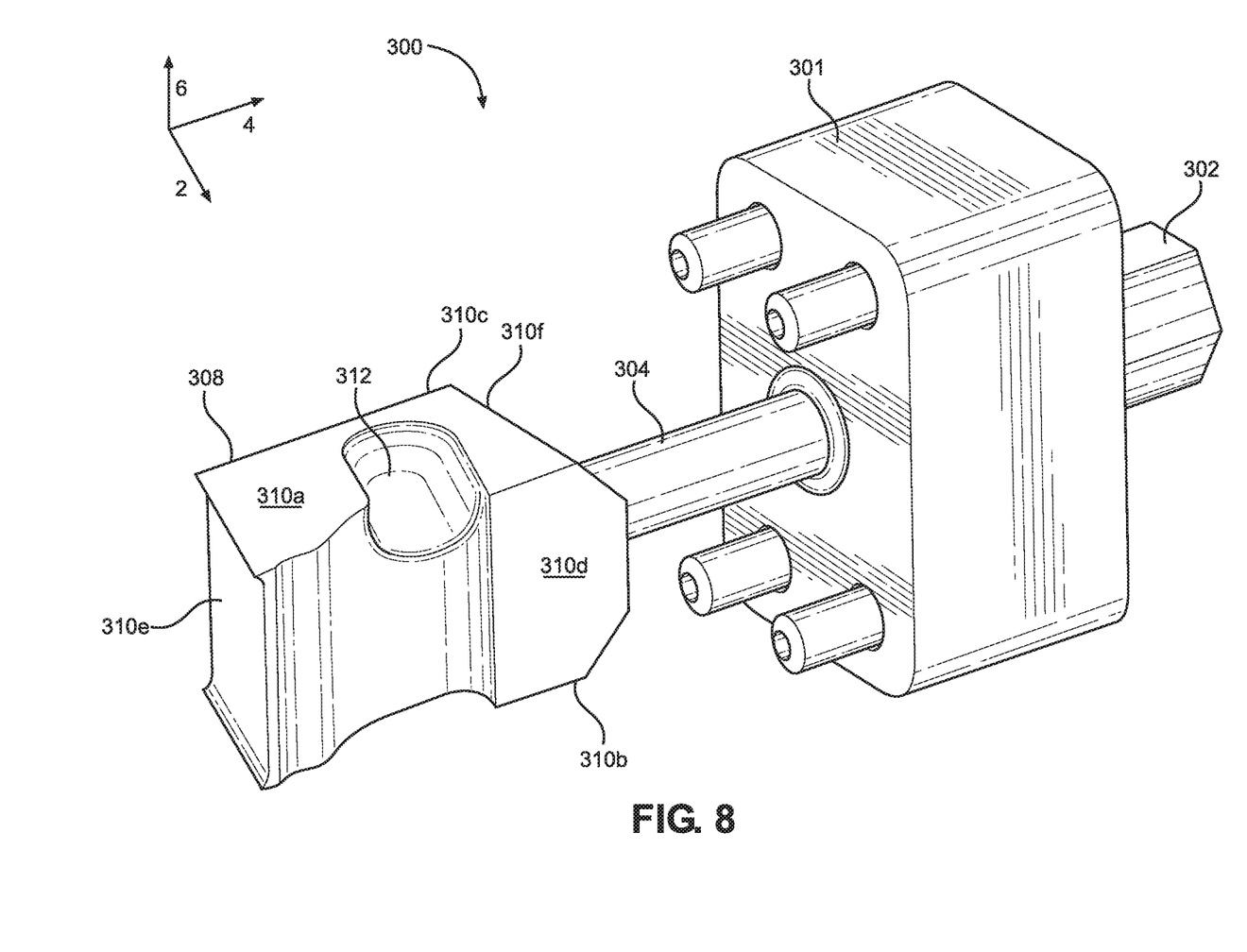
FIG. 8 is a perspective view of a second edge blocker of the edge encapsulation block shown in FIG. 2.

Now referring to FIGS. 6A, 6B, and 8, a second edge blocker 300 that is similar to the first edge blocker 200 will be described. The second edge blocker 300 includes a mounting block 301 and an actuation shaft 304 that extends through the mounting block 301. One end of the actuation shaft 304 is coupled to an edge actuator 302 while the other end of the actuation shaft 304 is connected to an edge block 308, such that the edge actuator 302 defines a first end 304a of the edge blocker 300, while the edge block 308 defines a second end 304b of the edge blocker 300. The edge block 308 can define a top surface 310a, a bottom surface 310b opposite the top surface along the vertical direction 6, a front surface 310c, a rear surface 310d opposite the front surface 310c along the longitudinal direction 2, an inner surface 310e, which can also be referred to as the channel surface, and an outer surface 310f opposite the inner surface 310e along the lateral direction 4. The actuation shaft 304 can extend into the edge block 308 through a block bore 316 that extends into the edge block 308 from the outer surface 310f and terminates at a location within the edge block 308 that is spaced from the inner surface 310e. The block bore 316 can define an internal threading that is configured to mate with an external threading defined by the actuator shaft 304, such that the edge block 308 and the actuator shaft 304 are threadedly connected. The edge block 308 can define a recess 312 that extends into the body of the edge block 308 for directing a flow of edge material, as will be described below. In the depicted embodiment, the recess 312 extends into the body of the edge block 308 from the top surface 310a and the rear surface 310d. However, in other embodiments of the second edge blocker 300, the recess 312 can extend into the edge block 308 from different ones of the surfaces 310a-310f as desired. To attach the second edge blocker 300 to the edge encapsulation block 15, fasteners 318 extend through the mounting block 201 and through the second side surface 16f of the housing 16. The fasteners 318 can be threaded, such that the fasteners 318 releasably couple the second edge blocker 300 to the housing 16. Alternatively, the fasteners 318 can permanently affix the second edge blocker 300 to the edge encapsulation block 15. The second edge blocker 300 can also include a seal 322, such as an O-ring, disposed around the actuator shaft 304 at the location the actuator shaft 304 extends through the inner side of the mounting block 301. This seal 322 can prevent edge material from migrating through the mounting block 301 and exiting the edge encapsulation block 15.

Continuing with FIGS. 6A-6B, the first block 102 defines a second inner surface 103b and a third inner surface 103c that is opposite the first inner surface 105a across the central extrusion channel 112 along the lateral direction 4. Similarly, the second block 104 defines a second inner surface 105b and a third inner surface 105c opposite the second inner surface 105b across the central extrusion channel 112 along the lateral direction 4. When the first and second blocks 102 and 104 are assembled, the second and third inner surfaces 130b and 103c of the first block 102 and the second and third inner surfaces 105b and 105c of the second block 104 partially define the central extrusion channel 112. When the first and second edge blockers 200 and 300 are attached to the edge encapsulation block 15, the edge block 208 of the first edge blocker 200 is received by the first pocket 142a of the first block 102 and the first pocket 146a of the second block 104, and the edge block 308 of the second edge blocker 300 is received by the second pocket 142b of the first block 102 and the second pocket 146b of the second block 104, such that the first edge block 208 is spaced from the second edge block 308 along the lateral direction 4. Additionally, the channel surface 210e of the edge block 208 and the channel surface 310e of the edge block 308 also partially define the central extrusion channel 112 when the first and second edge blockers 200 and 300 are attached to the housing 16. However, as depicted the first and second edge blockers 200 and 300 can be angularly offset from the first and second blocks 102 and 104. The first edge blocker 200 defines a first axis $A_1$ that extends centrally through the entire length of the actuation shaft 204 and through the central extrusion channel 112. The first axis $A_1$ can be angularly offset from the second inner surface 103b of the second block 102 and the second inner surface 105b of the second block 104 by an angle $\theta_1$. In the depicted embodiment, the angle $\theta_1$ is about 70 degrees. However, in other embodiments, the angle $\theta_1$ can be from about 50 degrees to about 90 degrees. Similarly, the second edge blocker 300 defines a second axis $A_2$ that extends centrally through the entire length of the actuation shaft 304 and through the central extrusion channel 112. The second axis $A_2$ can be angularly offset from the third inner surface 103c of the second block 102 and the third inner surface 105c of the second block 104. In the depicted embodiment, the angle $\theta_2$ is about 70 degrees. However, in other embodiments, the angle $\theta_2$ can be from about 50 degrees to about 90 degrees. Though the angles $\theta_1$ and $\theta_2$ are depicted as being the same, in other embodiments the angles $\theta_1$ and $\theta_2$ can be different.

When the first and second edge blockers 200 and 300 are attached to the housing, each of the first and second edge blockers 200 and 300 can be actuated so as to move the position of the respective edge blocks 208 and 308. The position of the edge blocks 208 and 308 controls the thickness of the edge material in the encapsulated material, as will be described further below. As shown in FIG. 6A, the edge block 208 can extend into the central channel 112 a first distance $D_1$ in a first position, where the first distance $D_1$ is measured as the distance between the channel surface 210e of the edge block 208 and the second inner surface 103b of the first block 102 along the lateral direction 4. The first distance $D_1$ can also be measured as the distance between the channel surface 210e of the edge block 208 and the second inner surface 105b of the second block 104 along the lateral direction 4, as the second inner surfaces 103b and 105b of the first and second blocks 102 and 104 can be substantially collinear when the first and second blocks 102 and 104 are assembled to comprise the housing 16. By actuating the edge actuator 202, the edge block 208 translates from the first position to a second position that is spaced from the first position along the first axis $A_1$ that extends through the central extrusion channel 112. As a result, in the second position as shown in FIG. 6B, the edge block 208 can extend into the central channel 112 a second distance $D_2$ that is different than the first distance $D_1$. The distance $D_2$ can be greater or less than the distance $D_1$. The path the edge block 208 moves along as a result of actuation of the edge actuator 202 is substantially linear, and involves no rotation of the edge block 208.

Likewise, the edge block 308 can extend into the central channel 112 a third distance $D_3$ in a first position, where the third distance $D_3$ is measured as the distance between the channel surface 310e of the edge block 308 and the third inner surface 103c of the first block 102 along the lateral direction 4. The third distance $D_3$ can also be measured as the distance between the channel surface 310e of the edge block 308 and the third inner surface 105c of the second block 104 along the lateral direction 4, as the third inner surfaces 103c and 105c of the first and second blocks 102 and 104 can be substantially collinear when the first and second blocks 102 and 104 are assembled to comprise the housing 16. By actuating the edge actuator 302, the edge block 308 translates from the first position to a second position that is spaced from the first position along the second axis $A_2$ that extends through the central extrusion channel 112. As a result, in the second position as shown in FIG. 6B, the edge block 308 can extend into the central channel 112 a fourth distance $D_4$ that is different than the third distance $D_3$. The fourth distance $D_4$ can be greater or less than the third distance $D_3$. The path the edge block 308 moves along as a result of actuation of the edge actuator 302 is substantially linear, and involves no rotations of the edge block 308. Though the first and third distances $D_1$ and $D_3$ are depicted as being the same and the second and fourth distances $D_2$ and $D_4$ are depicted as being the same, each of these distances can be different as desired. Additionally, the edge blocks 208 and 308 can be moved such that the channel surface 210e of the edge block 208 and the channel surface 310e of the edge block 308 do not extend into the central extrusion channel 112. In this configuration, the channel surface 210e of the edge block 208 is collinear with the second inner surfaces 103b and 105b, and the channel surface 310e of the edge block 308 is collinear with the third inner surfaces 103c and 105c.

To actuate the edge actuators 202 and 302, each of the edge actuators 202 and 302 can be manually rotated by an operator of the extrusion system 10. Rotation of the edge actuator 202 causes the actuator shaft 204 to rotate, while rotation of the edge actuator 302 causes the actuator shaft 304 to rotate. Because the actuator shaft 204 is threadedly engaged with the threading of the block bore 216, rotation of the actuator shaft 204 causes the threading of the actuator shaft 204 to interact with the threading of the block bore 216 to move the edge block 208 along the first axis $A_1$. Likewise, as the actuator shaft 304 is threadedly engaged with the threading of the block bore 316, rotation of the actuator shaft 304 causes the threading of the actuator shaft 304 to interact with the threading of the block bore 316 to move the edge block 308 along the second axis $A_2$. Each of the edge actuators 202 and 302 can be independently actuated. As a result, the edge blocks 208 and 308 can extend different differences into the central extrusion channel 112. For example, one of the edge blocks 208 and 308 can extend into the channel, while the channel surface 210e or 310e of the other edge block 208 or 308 is substantially collinear with a side of the central extrusion channel 112. Additionally, in another embodiment, the edge actuators 202 and 302 may be automatically actuated. In this embodiment, each of the edge actuators 202 and 302 can be rotated by respective motors (not shown) that receive instructions from a controller. The controller can contain a computer executable program that determines the appropriate distance that each of the edge blocks 208 and 308 should extend into the channel, or control the operation of the motor based upon input from an operator of the extrusion system 10 through a user interface. Further, it is contemplated that the edge actuators 202 and 302 may not be rotatably actuated, but rather actuated through movement of the edge actuators 202 and 302 and corresponding actuator shafts 204 and 304 along the respective first axis $A_1$ and second axis $A_2$. In this embodiment, the edge actuator 202, actuator shaft 204, and edge block 208 of the first edge blocker 200 are moved as a unit along the first axis $A_1$, while the edge actuators 302, actuator shaft 304, and edge block 308 of the second edge blocker 300 are moved as a unit along the second axis $A_2$.

In operation, the edge encapsulation block 15 is introduced into the extrusion system 10 by connecting the inlet 106 of the central extrusion channel 112 with a coextrusion feed block 14 (or alternatively another type of feed block), the outlet 108 of the central extrusion channel 112 with a die 18, and the inlet 116 of the edge encapsulation channel 120 with an edge material supply 17. Before the extrusion system 10 begins operation, the operator determines the desired thickness of the edge material that will be part of the encapsulated material to be emitted from the outlet 108 of the central extrusion channel 112. To implement the desired thickness, the operator must actuate the edge actuator 202 and/or edge actuator 302 to adjust the distance that the edge block 208 and/or edge block 308 extends into the central extrusion channel 112. This distance (for example, first through fourth distances $D_1$-$D_4$ shown in FIGS. 6A-6B) represents the thickness of the edge material. The distances that each of the edge blocks 208 and 308 extend into the central extrusion channel 112 can be the same or different, depending on the intended encapsulated material to be produced.

Once the first and second edge blockers 200 and 300 have been appropriately adjusted, the operator starts the extrusion system 10, thus beginning the process of the coextrusion feed block 14 providing multilayer material to the central extrusion channel 112 of the edge encapsulation block 15 through the inlet 106. Concurrently, the edge material supply 17 begins providing edge material to the edge encapsulation channel 120 through the inlet 116. This edge material flows through the edge encapsulation channel 120, which includes splitting the flow of edge material to flow through both portions 120a and 120b of the edge encapsulation channel. After flowing through these portions, the edge material flows out of first outlet 118a and into the recess 212 of the first edge blocker 200, and out of the outlet 118b and into the recess 312 of the second edge blocker 300. Each recess 212 and 312 then directs the edge material into the central extrusion channel 112. Accordingly, the recess 212 of the first edge blocker 200 can be in fluid communication with the first outlet 118a of the edge encapsulation channel 120 and the central extrusion channel 112, while the recess 312 of the second edge blocker 300 can be in fluid communication with the second outlet 118b of the edge encapsulation channel 120 and the central extrusion channel 112. The amount of edge material that flows through each of the recesses 212 and 312 is determined by the distance that the respective edge blocks 208 and 308 extend laterally into the central extrusion channel 112.

Once the central material flows to the portion of the central extrusion channel 112 where the edge blocks 208 and 308 extend into the central extrusion channel 112, the flow of central material is partially obstructed by the edge blocks 208 and 308, particularly the front and channel surfaces 210c and 210e of the edge block 208 and the first and channel surfaces 310c and 310e of the edge block 308. This functions to form the central material into its intended final width as part of the encapsulated material. As the central material flows past the rear portion of the channel surfaces 210e and 310e of the edge blocks 208 and 308, the edge material flows through the recesses 212 and 312, into the central extrusion channel 112, and comes into contact with the central material. As a result, an encapsulated material is formed comprised of a central material laterally bounded by a thickness of edge material determined by the positions of the edge blocks 208 and 308 relative to the central extrusion channel 112. The encapsulated material therefore defines two discrete edges that extend substantially along the machine direction—one edge being between the central material and the edge material on one side of the encapsulated material, and the other edge being between the central material and the edge material on the opposite side of the encapsulated material in the lateral direction 4. The encapsulated material then flows through the remainder of the central extrusion channel 112, and out of the outlet 108 of the central extrusion channel 112 to the die 18.

During operation of the extrusion system 10, the operator can periodically adjust the positions of the edge blocks 208 and 308 to accommodate new intended encapsulated materials, or to account for a new type of edge material or new type or configuration of central material. The operator can also adjust one of the edge blocks (such as the edge block 208, for example), such that the channel surface 210e of the edge block 208 is substantially collinear with the second inner surface 103b of the first block 102 and the second inner surface 105b of the second block 104. In this configuration, edge material will only flow through the recess 312 of the edge block 308 and into the central extrusion channel, while edge material will be blocked from flowing into the central extrusion channel 112 from the recess 212. The resulting encapsulated material will only include a single layer of edge material on one side. As such, the recesses 212 and 312, and thus the first and second portions 120a and 120b of the edge encapsulation channel 120, are both selectively in fluid communication with the central extrusion channel 112. In another configuration, both the channel surface 210e of the edge block 208 is substantially collinear with the second inner surface 103b of the first block 102 and the second inner surface 105b of the second block 104, and the channel surface 310e of the edge block 308 is substantially collinear with the third inner surface 103c of the first block 102 and the third inner surface 105c of the second block 104. In this configuration, edge material will be completely blocked from flowing into the central extrusion channel 112. As a result, the resulting encapsulated material will be completely comprised of the central material that enters the edge encapsulation block 15.

The formation of an encapsulated material that includes a central portion defined by extruded material and edge portions defined by an edge material can help reduce waste of costly extruded material during the operation of the product formation process. The edge material can be significantly cheaper than the central material. As a result, should the encapsulated material require trimming, the less expensive edge material will be discarded, rather than the more costly central material. Additionally, should the central material alone have wavy or nonlinear edges after the extrusion process due to not achieving complete solidity, the edge material can bound the central material and provide a defined edge that keeps the central material contained in its intended width and shape.

Further, the edge encapsulation block 15 provides several advantages for performing the edge encapsulation operation. The actuation of the edge actuators 202 and 302 through rotation, as well as the threaded engagement of the actuation shafts 204 and 304 with the edge blocks 208 and 308, which allows the edge blocks 208 and 308 to move linearly along the first and second axes $A_1$ and $A_2$, respectively, allows for simple and easily controllable adjustment of the edge material thickness. Additionally, the inclusion of a respective edge actuator 202 and 302 for each of the edge blocks 208 and 308 allows for each of the edge blocks 208 and 308 to be independently adjusted, thus providing even greater control over edge material thickness. Further, the modular construction of the housing 16 by including two different blocks 102 and 104 allows for simple disassembly to remove hardened material that may accumulate within the housing 16 or replace the first and/or second edge blockers 200 and 300 due to wear or the commencement of a new extrusion operation.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. An edge encapsulation block, comprising:
   a housing that defines 1) a central extrusion channel having an inlet for receiving a central material and an outlet for emitting an encapsulated material that includes the central material and an edge material, and 2) an edge encapsulation channel for receiving the edge material; and
   an edge blocker comprising:
      an edge actuator at a first end of the edge blocker; and
      an edge block at a second end of the edge blocker that is opposite the first end,
   wherein actuation of the edge actuator causes the edge block to translate between a first position and a second position spaced from the first position along an axis that extends through the central extrusion channel, wherein the edge block extends into the central extrusion channel a first distance in the first position, wherein, in the first position, the edge block is partially positioned within a recess of the housing, the recess being open to both the central extrusion channel and the edge encapsulation channel, and in the second position, the edge block extends into the central extrusion channel a second distance, greater than the first distance, and wherein the edge encapsulation block increases a thickness of the edge material applied to the central material when the edge block moves from the first position to the second position.

2. The edge encapsulation block of claim 1, wherein the edge encapsulation channel is selectively in fluid communication with the central extrusion channel.

3. The edge encapsulation block of claim 2, wherein the edge blocker is a first edge blocker, the edge actuator is a first edge actuator, the edge block is a first edge block, and the axis is a first axis, the edge encapsulation block further including a second edge blocker comprising:
   a second edge actuator at a first end of the second edge blocker; and
   a second edge block at a second end of the second edge blocker that is opposite the first end,
   wherein actuation of the second edge actuator causes the second edge block to translate from a third position to a fourth position spaced from the third position along a second axis that extends through the central extrusion channel.

4. The edge encapsulation block of claim 3, wherein the second edge block extends into the central extrusion channel a third distance in the third position that is different than the first and second distances.

5. The edge encapsulation block of claim 3, wherein the inlet of the housing is spaced from the outlet along a machine direction, and the first edge blocker is spaced from the second edge blocker along a lateral direction that is perpendicular to the machine direction.

6. The edge encapsulation block of claim 3, wherein the first edge actuator is capable of actuation independent from the second edge actuator.

7. The edge encapsulation block of claim 3, wherein the edge encapsulation channel includes an inlet, a first outlet in fluid communication with the first edge block, and a second outlet in fluid communication with the second edge block.

8. The edge encapsulation block of claim 7, wherein the first edge block defines a recess that is in fluid communication with the first outlet and the central extrusion channel, and the second edge block defines a recess that is in fluid communication with the second outlet and the central extrusion channel.

9. The edge encapsulation block of claim 1, wherein the housing has an inner surface that partially defines the central extrusion channel, and the axis is angularly offset from the inner surface by an angle that is about 70 degrees.

10. The edge encapsulation block of claim 1, wherein the edge actuator is actuated through rotation.

11. The edge encapsulation block of claim 10, wherein the edge actuator is coupled to an actuator shaft that threadedly engages the edge block.

12. The edge encapsulation block of claim 1, wherein the housing includes a first block and a second block releasably coupled to the first block, such that the first and second blocks each partially define the edge encapsulation channel.

13. The edge encapsulation block of claim 1, wherein the edge blocker is releasably coupled to the housing.

14. The edge encapsulation block of claim 1, wherein the inlet of the central extrusion channel is configured to receive a central material comprising a monolayer material.

15. The edge encapsulation block of claim 1, wherein the inlet of the central extrusion channel is configured to receive a central material comprising a multilayer material from a coextrusion feed block.

16. The edge encapsulation block of claim 1, wherein the inlet of the housing is spaced from the outlet along a machine direction, and the encapsulated material defines an edge that separates the edge material and the central material, wherein the edge extends substantially along the machine direction.

17. The edge encapsulation block of claim 1, wherein actuation of the edge actuator further causes the edge block to translate to a third position, wherein in the third position, the edge block is fully positioned within the recess of the housing.

18. An extrusion system, comprising:
an edge encapsulation block, comprising:
  a housing that defines 1) a central extrusion channel having an inlet for receiving a central material and an outlet for emitting an encapsulated material that includes the central material and an edge material, and 2) an edge encapsulation channel for receiving the edge material, wherein the inlet is spaced from the outlet along a machine direction; and
  edge blocker comprising:
    an edge actuator; and
    an edge block connected to the edge actuator, the edge block having a channel surface that partially defines the central extrusion channel, the channel surface being parallel to an inner surface of the central extrusion channel,
  wherein actuation of the edge actuator causes the edge block to translate between a first position and a second position spaced from the first position along an axis that extends through the central extrusion channel, wherein the edge block extends into the central extrusion channel a first distance in the first position and a second distance, greater than the first distance, in the second position, and wherein the edge encapsulation block partially obstructs the central material so as to decrease a width of the central material when the edge block moves from the first position to the second position; and
a die having an inlet for receiving the edge encapsulated material and an outlet for emitting an extruded material.

19. The extrusion system of claim 18, further comprising:
a coextrusion feed block for combining a plurality of extrusion flows to produce the central material, wherein each of the plurality of extrusion flows is received from a respective extruder.

20. An edge encapsulation block, comprising:
a housing that defines 1) a central extrusion channel having an inlet for receiving a central material and an outlet for emitting an encapsulated material that includes the central material and an edge material, and 2) an edge encapsulation channel having another inlet for receiving the edge material, wherein the edge encapsulation channel extends from the other inlet through the housing to a first outlet and a second outlet located interior to the housing, the housing comprising:
  a first block, and
  a second block releasably coupled to the first block, such that the first and second blocks each partially define the edge encapsulation channel,
  wherein the first block defines a first recess that extends into an inner surface of the first block along a longitudinal direction, the second block defines a second recess that extends into an inner surface of the second block along the longitudinal direction, and each of the first and second recesses partially define the inlet and the first and second outlets of the edge encapsulation channel; and
an edge blocker comprising:
  an edge actuator at a first end of the edge blocker, and
  an edge block at a second end of the edge blocker that is opposite the first end,
  wherein the edge block is positionable within a recess of the housing, the recess being open to both the central extrusion channel and the edge encapsulation channel,
wherein actuation of the edge actuator causes the edge block to translate between a first position and a second position spaced from the first position along an axis that extends through the central extrusion channel.

* * * * *